US011996753B2

(12) United States Patent
da Rosa Kaizer et al.

(10) Patent No.: US 11,996,753 B2
(45) Date of Patent: May 28, 2024

(54) DRAIN PLUG WITH PERIMETER LABYRINTH FOR CASINGS OF ROTARY ELECTRIC MACHINES AND CORRESPONDING CASING

(71) Applicant: WEG EQUIPAMENTOS ELÉTRICOS S.A., Jaraguá do Sul (BR)

(72) Inventors: Gustavo da Rosa Kaizer, Jaraguá do Sul (BR); Milton Oscar Castella, Jaraguá do Sul (BR); Paulo Henrique Nicolau, Jaraguá do Sul (BR); Tiago Baggio, Jaraguá do Sul (BR)

(73) Assignee: WEG EQUIPAMENTOS ELÉTRICOS S.A., Jaraguá do Sul (BR)

( * ) Notice: Subject to any disclaimer, the term of this patent is extended or adjusted under 35 U.S.C. 154(b) by 260 days.

(21) Appl. No.: 17/754,841

(22) PCT Filed: Oct. 15, 2019

(86) PCT No.: PCT/BR2019/050443
§ 371 (c)(1),
(2) Date: Apr. 13, 2022

(87) PCT Pub. No.: WO2021/072512
PCT Pub. Date: Apr. 22, 2021

(65) Prior Publication Data
US 2023/0136680 A1    May 4, 2023

(51) Int. Cl.
*H02K 5/10* (2006.01)
*F16L 55/11* (2006.01)

(52) U.S. Cl.
CPC ............ *H02K 5/10* (2013.01); *F16L 55/1141* (2013.01); *H02K 2205/09* (2013.01)

(58) Field of Classification Search
CPC .... H02K 5/10; H02K 2205/09; F16L 55/1141
See application file for complete search history.

(56) References Cited

U.S. PATENT DOCUMENTS 5,053,633 A * 10/1991 Sugiyama ............... F02N 15/00
                                                                    74/6
5,747,904 A *  5/1998 Sudhoff .................... H02K 5/10
                                                                   310/58
9,083,209 B2 * 7/2015 Kuwada .................... H02K 5/10

FOREIGN PATENT DOCUMENTS

JP      H11-98615 A      4/1999
JP    2004-120939 A      4/2004
(Continued)

OTHER PUBLICATIONS

JP-2012196102-A_translate (Year: 2012).*
(Continued)

*Primary Examiner* — Tulsidas C Patel
*Assistant Examiner* — Mohammed Ahmed Qureshi
(74) *Attorney, Agent, or Firm* — Knobbe, Martens, Olson & Bear, LLP

(57) ABSTRACT

The present invention relates to a drain plug (100) with a head (200) comprising at least one transversal through-bore (210) and at least one contact surface (220) concentric to the drain plug (100) longitudinal axis, and by a body (300) comprising at least one through-bore (310) adjacent and complementary to the through-bore (210) of the head (200), at least one annular through-channel (320) of perimeter platform (330) and limited by the surface (220). The body (300) also has one or more sets of alternating fluid-conducting channels, formed by the alternation of annular channels (340, 360, 380), of perimeter platforms (330, 350, 370, 390), of longitudinal walls (331, 351, 371), and of longitudinal (Continued)

openings (332, 352, 372, 382). This invention also relates to a corresponding casing for rotating electrical machine.

11 Claims, 6 Drawing Sheets

(56) References Cited

FOREIGN PATENT DOCUMENTS

| | | |
|---|---|---|
| JP | 2011-103730 A | 5/2011 |
| JP | 2012-196102 A | 10/2012 |
| JP | 2012196102 A * | 10/2012 |
| WO | WO 2021/072512 A1 | 4/2021 |

OTHER PUBLICATIONS

Search Report in corresponding International Patent Application No. PCT/BR2019/050443, dated Dec. 5, 2019, in 4 pages.
Written Opinion in corresponding International Patent Application No. PCT/BR2019/050443, dated Dec. 5, 2019, in 3 pages.

* cited by examiner

DRAIN PLUG WITH PERIMETER LABYRINTH FOR CASINGS OF ROTARY ELECTRIC MACHINES AND CORRESPONDING CASING

APPLICATION FIELD

The present invention belongs to the rotating electrical machines field, in particular casings, enclosures and supports thereof, notably casings with arrangements for protection against foreign bodies penetration, e.g., water or solids, as well as for liquids drainage from said casings.

INTRODUCTION

The present invention relates to a drain plug with a perimeter labyrinth endowed with a head and a body, wherein the drain plug comprises a through-bore in the transition region between the head and the body, the body further comprising at least one annular channel and at least one set of alternating fluid-conducting channels formed by the alternation of annular channels, of perimeter platforms, of walls and openings, providing a plug capable of draining the casings interior and concomitantly preventing fluids or dirt from entering the casings interior.

Moreover, the present invention relates to a corresponding casing for a rotating electrical machine.

BACKGROUND OF THE INVENTION

Rotating electrical machines are equipment used for transforming electrical energy into mechanics, in the case of engines, and vice versa, in the case of generators.

Depending on the application and use conditions, rotating electric machines can be installed in specific environments, which are subject to the weather and normal conditions that occur in temperature variations or differentials, internally or externally.

External conditions may include rain, wind, water jets, water waves and the like, while both external and especially internal conditions are characterized by the formation of condensation water.

This condition requires a fluidic connection between the casings inside and outside, allowing to expel condensed moisture or internally accumulated fluids without, however, allowing fluids to enter from the outside, which would compromise the electrical and mechanical safety of the rotating electric machine, as well as other equipment disposed inside the casing.

This demand is met by means of drains that both allow evacuation and prevent the fluids penetration into casings of the nature treated herein.

Thus, the drains will be part of the casings and must meet strict specific standards such as, e.g., IEC60034-5 and IEC60529 and other similar standards to ensure protection classes such as IP66 and similar.

In addition, said drains must also be constructed and constituted so as not to oxidize, not to deform beyond certain limits and not to release particles or fragments that may obstruct or hinder drainage, even in the most adverse conditions that include, e.g., sea breeze, water jets straightly directed against the drain and other similar situations.

STATE OF THE ART

There are in the current state of the art several solutions that provide drains for fluidic connection between the inside and the outside of the casings for rotating electric machines and their accessories.

An example is Japanese patent document No. JP2012196102 which discloses and describes a drain hole structure fora fully enclosed engine in order to reduce entrance of water, dust and the like from outside the engine. The fully enclosed engine to which this invention is intended is an engine type having a housing provided with a through hole, wherein a liner having an outer circumferential surface is inserted in the through hole to be adjusted to an inner circumferential surface of this through hole. The liner outer circumferential surface has non-linear grooves that allow water to be drained from the engine to the outside and also prevent water, dust and the like from entering the interior of the engine via gravity.

The first disadvantage of the solution proposed by JP2012196102 is that the hole needs to be adapted to the plug, requiring design adaptations and limiting the application of this solution to specific casings, reducing the chances of use in already existing products. Another disadvantage is that the water conduction occurs directly in the labyrinth passage channels, both in the outward direction and in the inward direction and, in particular, in the case of direct jets where the construction promotes limited speed reduction and a relatively short path to be transposed by the fluid.

Another solution of the pertinent state of the art is the one described by U.S. 9,083,209, which discloses a drain structure for electric rotary machine that includes a casing with a through hole and a drain element for draining water from the casing. The drain element of this invention has an assembly portion that includes hooks, each with a proximal part and a distal part. The proximal part extends into the through hole penetration direction. The distal part has a distal end constituting an insertion end. The assembly part is mounted in the through hole by inserting the hooks into the through hole by the insertion ends. The hook proximal parts have flexibility to bend in a bending direction perpendicular to the penetration direction during the hooks' insertion into the through hole. Each of the hooks also has a protrusion that protrudes from the proximal part outer surface towards the through hole inner wall to restrict the hook movement relative to the through hole.

The drain element of U.S. 9,083,209 has a fairly long internal conduction path for the fluid in addition to an outlet hole perpendicular to the element longitudinal axis. However, the labyrinth is practically nonexistent, since the inner part has only an off-center bulkhead, which is not enough in extreme cases of application, such as high-pressure water jets. In addition, and no less disadvantageous, there is the fact that the body of the drain element is almost fully exposed or projected out of the casing, occupying space and unnecessarily exposing the drain.

As can be inferred from the foregoing, there is room and demand for a drainage solution for rotating electric machine sets arranged in casings that overcome the state of the art drawbacks.

OBJECTIVES OF THE INVENTION

One of the present invention objectives is therefore to provide a drain plug according to the features of claim 1 of the appended set of claims.

One of the present invention objectives is therefore to provide a drain plug according to the features of claim 9 of the appended set of claims.

Another objective of the present invention is to provide a corresponding casing for rotating electrical machine according to the features of claims 10 and 11 of the appended set of claims.

Further features and features details are represented by the dependent claims.

BRIEF DESCRIPTION OF THE FIGURES

For better understanding and visualization of the present invention subject matter, it will now be described with reference to the appended drawings, representing the technical effect obtained by means of an exemplary embodiment not limiting the scope of the present invention, wherein, schematically.

DETAILED DESCRIPTION OF THE INVENTION

Figure 1:
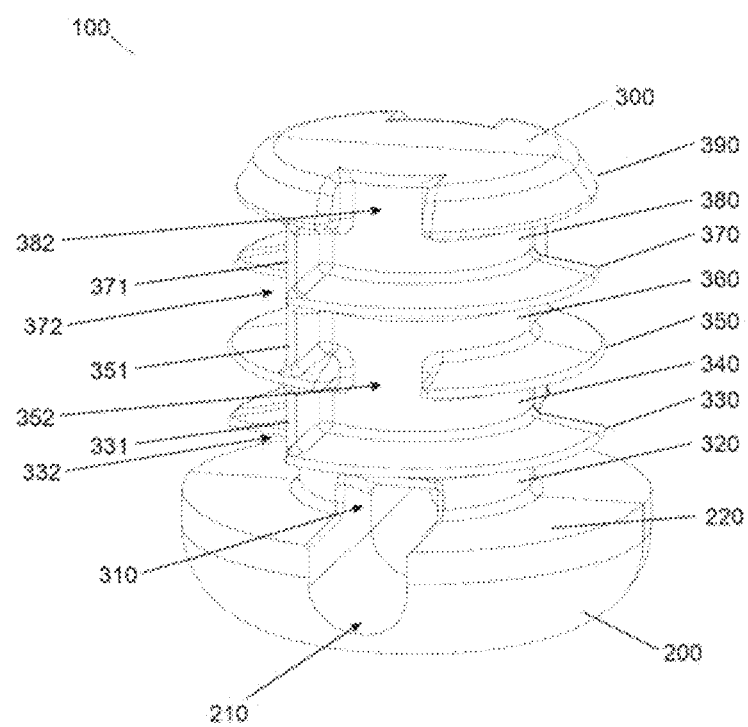
FIG. 1 shows an anterolateral perspective view of a drain plug according to the invention.
Figure 2:
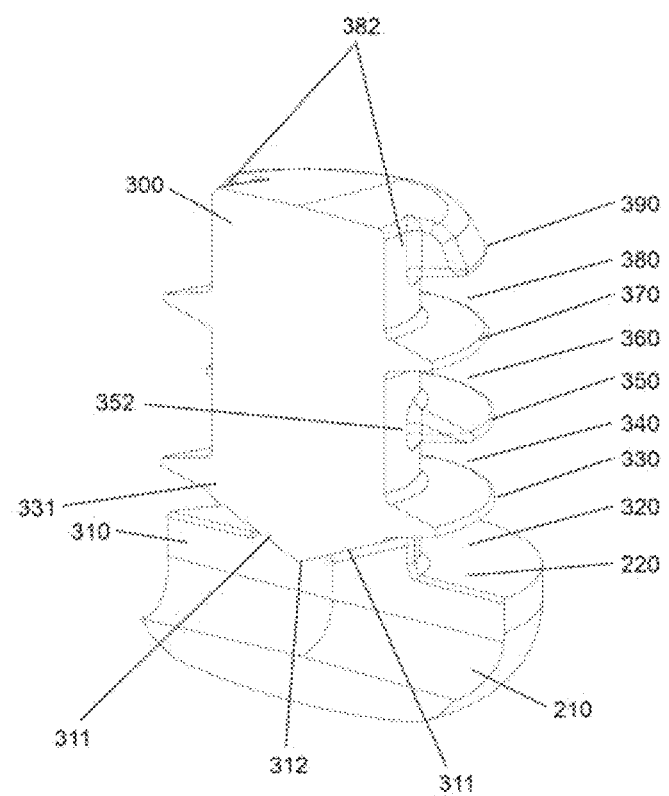
FIG. 2 shows the drain plug of FIG. 1 in partial section.
Figure 3:
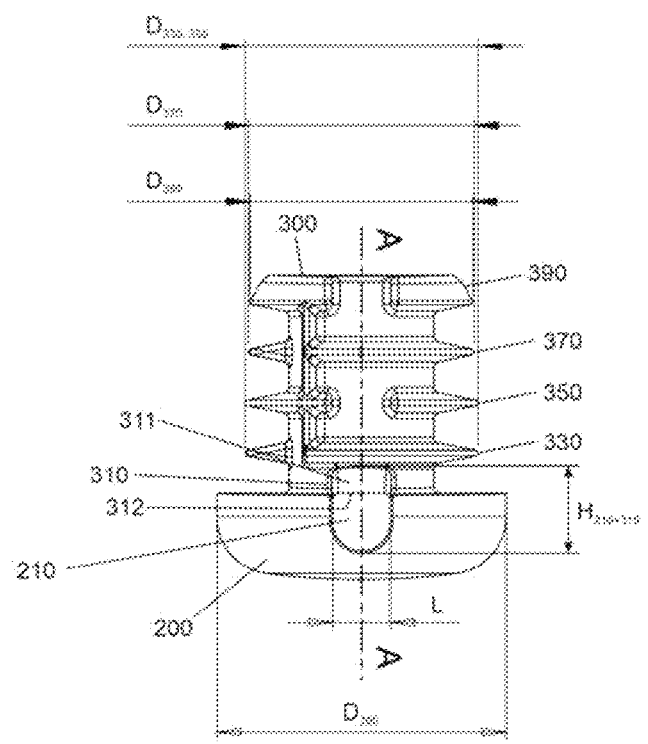
FIG. 3 shows a side view of a drain plug according to the invention.
Figure 4:
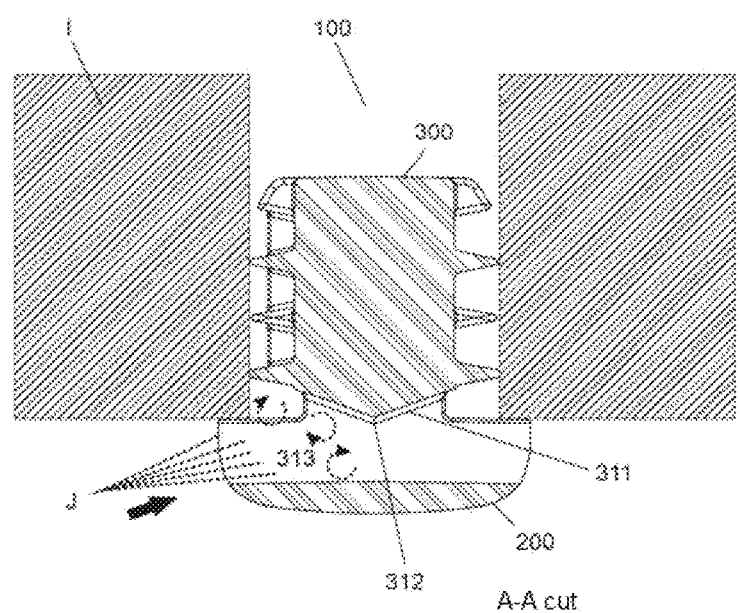
FIG. 4 shows a side view of section A-A of FIG. 3.
Figure 5:
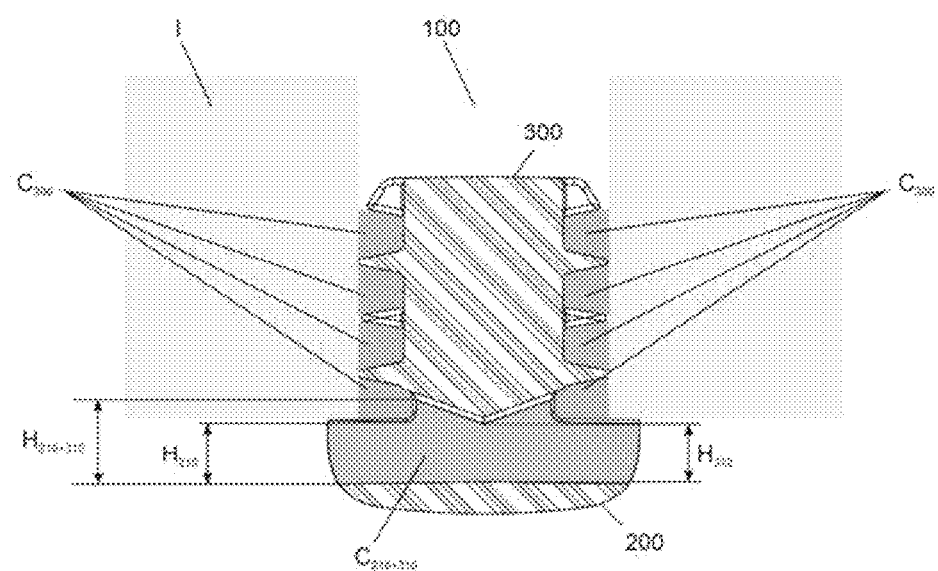
FIG. 5 shows another side view of section A-A of FIG. 3.
Figure 6:
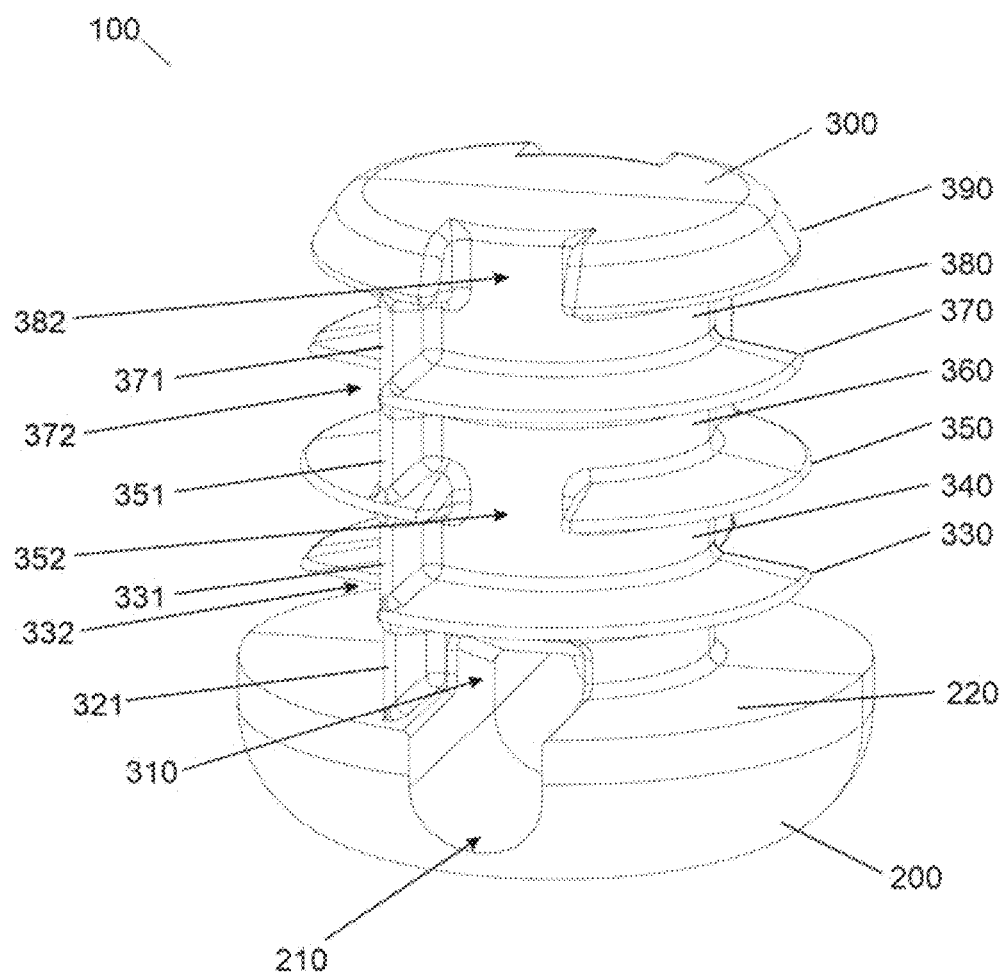
FIG. 6 shows an anterolateral perspective view of a preferred embodiment of the drain plug according to the invention.

The present invention relates to a drain plug with perimeter labyrinth or simply drain plug (100) to be used in casings (I) of rotating electric machines, notably in openings of one or more walls or neighboring regions thereof that separate the rotating electric machine from the environment in which it is installed.

The drain plug (100) basically comprises a head (200) and a body (300), the drain plug (100) being preferably formed in a single body, but that may be constituted of two or more pieces, depending on the application conditions and intended dimensions.

The drain plug (100) comprises a through-bore in the transition region between the head (200) and the body (300), the through-bore therefore having adjacent and complementary head piece (210) and body piece (310). The through-bore (210, 310) may have various geometries, preferably being transverse or perpendicular to the drain plug (100) longitudinal axis.

The head (200) then comprises at least one head piece (210) of the through-bore preferably perpendicular to the drain plug (100) longitudinal axis, in addition to at least one contact surface (220) preferably perpendicular to the drain plug (100) longitudinal axis, and forming an external annular plane perpendicular to the drain plug (100) longitudinal axis, assisting the annular sealing and also acting as a stop when the drain plug (100) is inserted into a casing (I) opening.

The body (300) has at least one body piece (310) of the through-bore, preferably perpendicular to the drain plug (100) longitudinal axis, further comprising one or more sets of alternating fluid-conducting channels, formed by the alternation of annular channels (320, 340, 360, 380), of perimeter platforms (330, 350, 370, 390), of walls (331, 351, 371) and of openings (332, 352, 372, 382).

The set of alternating fluid-conducting channels is ultimately discharged in outflow openings formed by the respective head (210) and body (310) pieces of the through-bore.

The body (300) has, in the through-bore (310) region, adjacent inclined surfaces (311) that are in one or more vertex (312), working as bulkheads (311) for possible fluid jets (J) that are directed from the outside against the drain plug (100).

These bulkheads (311) form tumbling zones (313) with each other, the contact surface (220), the annular-through channel (320), the perimeter platform (330), and the casing (I) itself.

These tumbling zones (313) are used to reduce the external fluid speed, while the vertex (312) forms a restriction to the external fluid passage, and in this region the passing fluid velocity is increased and, consequently, the pressure is reduced, decreasing and even avoiding the fluid upward movement coming from the outside. The fluid jets (J) directed against either side of the through-bore head and body pieces (210, 310) may outflow through it or via the annular-through channel (320).

It is noteworthy, therefore, that fluid jets, even when directed straightly against the drain plug (100) head (200), will have their impact force reduced, in a first instance, by the through-bore in their body head pieces (210, 310) and, in a second instance, by the circulation region formed by the annular through-channel (320), mitigating, in addition, the risk of the fluid ascending into the casing (I).

Therefore, the drain plug (100) according to the invention offers a double protection against the unwanted fluid and dirt penetration, an unprecedented technical effect in relation to their corresponding state of the art.

The fluid drainage function from the interior of the casing (I) is given by passing, by gravity, through the first openings (382) and then through the paths determined by the annular channels (380) between the perimeter platforms (390, 370) and the walls (371); then passing through the openings (372) and through the paths determined by the annular channels (360) between the perimeter platforms (370, 350) and the walls (351); then passing through the openings (352) and through the paths determined by the annular channels (340) between the perimeter platforms (350, 330) and the walls (331); then passing through the openings (332) and through the path determined by the annular channel (320) between the perimeter platform (330) and the contact surface (220); to then discharge into outflow openings formed by the through-bores (210, 310) and thus to the external environment. It should be noted that the quantity of the elements described herein may vary according to the drain plug (100) construction, conditions and dimensions.

As can be inferred from the present disclosure, the drain plug (100) has elements that form a double-pass labyrinth, which, in addition, allow easy and unobstructed fluid outflow from the casing (I) interior. Concomitantly, the drain plug (100) of the invention has double protection that prevents the fluids passage even under high pressure in the opposite direction (into the casing (I)).

The drain plug (100) is preferably made of resilient material, with sufficient elasticity to provide the sealing between its contact surfaces and casing (I) opening for which it is intended, and may be of a single material, of one or more materials, of a material with variable density or other suitable compositions and the like.

It should be noted that the perimeter platforms (330, 350, 370, 390) external diameters are all smaller than the head (200) external diameter and preferably smaller than the casing (I) opening diameter or dimension, on which the drain plug (100) will be mounted, the assembly of which being preferably made with the dimensional interference necessary for the labyrinth formation and dimensional stabilization that both prevents the fluid and dirt penetration and allows the drainage of the casing (I) interior.

In addition, for the purpose of facilitating assembly, the perimeter platforms external diameters decrease in the drain plug (100) direction of insertion into the casing (I) and, for the purpose of improved sealing, the perimeter platforms (330, 350) external diameters ($D_{330,350}$) are equal to and, therefore, as above, larger than the perimeter platform (370) diameter ($D_{370}$) and, therefore, larger than the perimeter platform (390) diameter ($D_{390}$) and, as aforementioned, all smaller than the head (200) external diameter ($D_{200}$), providing the drain plug (100) with a certain tapering, considering that the drain plug (100) assembly must be made with dimensional interference in relation to the casing (I) opening dimensions to which it is intended.

The through-bores (210, 310) should be sized so that the total height ($H_{210+310}$) of the set formed by both through-bores (210, 310) is 10 to 60%, preferably 45% greater than its width (L). The annular or perimeter or enclosing chambers ($C_{300}$) formed between the annular channels (320, 340, 360, 380) have, together, a volume that should be equal to or greater than the chamber ($C_{210+310}$) volume formed by the through-bore head and body pieces (210, 310).

In a preferred embodiment of the invention, the body (300) is endowed, in addition to the walls (331, 351, 371), with one or more additional walls (321) located closest to the head (200), thus not having at least one annular through-channel (320) below the perimeter platform (330) and limited by the surface (220).

This preferred embodiment, therefore, comprises a head (200) and a body (300) and a through-bore in the transition region between the head (200) and the body (300), in addition to one or more sets of alternating fluid conduction channels, formed by the alternation of annular channels (340, 360, 380), of perimeter platforms (330, 350, 370, 390), of walls (321, 331, 351, 371) and of openings (332, 352, 372, 382).

Conclusion

It will be readily understood by those skilled in the art that modifications can be made to the present invention without teaching away from the concepts set forth in the above description. Such modifications are to be considered as encompassed by the present invention's scope. Accordingly, the particular embodiments described in detail above are illustrative and exemplary only and not limiting as to the present invention's scope, to which the full extent of the appended claims and any and all equivalents thereof should be given.

The invention claimed is:

1. A drain plug with perimeter labyrinth for casings of rotating electrical machine comprising:
   a head;
   a body;
   a through-bore in a transition region between the head and the body;
   a perimeter platform comprising at least one annular through-channel limited by a surface; and
   at least one set of alternating fluid-conduction channels formed by an alternation of a plurality of annular channel, a plurality of perimeter platform, a plurality of walls and a plurality of openings.

2. The drain plug of claim 1, wherein the at least one set of alternating fluid-conduction channels discharge into outflow openings formed by the head and body.

3. The drain plug of claim 1, further comprising adjacent inclined surfaces in the through-bore region, the adjacent inclined surfaces terminating at one or more vertexes of the through-bore region.

4. The drain plug of claim 1, wherein an external diameter of the plurality of perimeter platforms is smaller than an external diameter of the head.

5. The drain plug of claim 1, wherein an external diameter of the plurality of perimeter platforms decreases in a drain plug insertion direction into the casing.

6. The drain plug of claim 1, wherein the through-bore comprise dimensions such that a total height of a set formed by multiple through-bores is from 10 to 60%, preferably 45% greater than a width of the multiple through-bores.

7. The drain plug of claim 1, wherein an annular or perimeter or enclosing chambers formed between the annular channels comprise a volume equal to or greater than a volume of a chamber formed by the through-bore head and body.

8. The drain plug of claim 7, wherein the external diameters of at least one of the plurality of perimeter platforms are equal to or larger than the diameter of perimeter platform diameter and larger than the perimeter platform diameter.

9. A casing for a rotating electric machine, wherein the casing comprises a drain plug of claim 7.

10. A drain plug with a perimeter labyrinth for casings of a rotating electrical machine comprising: a head; a body; a through-bore in a transition region between the head and the body, and one or more sets of alternating fluid-conduction channels formed by an alternation of annular channels, perimeter platforms, walls and openings.

11. A casing for a rotating electric machine, wherein the casing comprises a drain plug of claim 10.

\* \* \* \* \*